US012602752B2

(12) United States Patent
Lin et al.

(10) Patent No.: US 12,602,752 B2
(45) Date of Patent: Apr. 14, 2026

(54) IMAGE PROCESSING METHOD AND IMAGE PROCESSING APPARATUS

(71) Applicant: GENESYS LOGIC, INC., New Taipei City (TW)

(72) Inventors: Jin-Min Lin, New Taipei City (TW); Wei-Zheng Pan, New Taipei City (TW); Chuan-Yue Yang, New Taipei City (TW)

(73) Assignee: GENESYS LOGIC, INC., New Taipei City (TW)

( * ) Notice: Subject to any disclaimer, the term of this patent is extended or adjusted under 35 U.S.C. 154(b) by 698 days.

(21) Appl. No.: 17/978,227

(22) Filed: Nov. 1, 2022

(65) Prior Publication Data

US 2023/0140865 A1    May 11, 2023

Related U.S. Application Data

(60) Provisional application No. 63/276,666, filed on Nov. 8, 2021.

(51) Int. Cl.
| | |
|---|---|
| *G06T 5/70* | (2024.01) |
| *G06T 3/40* | (2006.01) |
| *G06T 5/50* | (2006.01) |
| *G06T 5/73* | (2024.01) |
| *G06T 9/00* | (2006.01) |

(52) U.S. Cl.
CPC ................ *G06T 5/70* (2024.01); *G06T 3/40* (2013.01); *G06T 5/50* (2013.01); *G06T 5/73* (2024.01); *G06T 9/00* (2013.01); *G06T 2207/20182* (2013.01); *G06T 2207/20208* (2013.01); *G06T 2207/20221* (2013.01)

(58) Field of Classification Search
CPC .... G06T 5/70; G06T 3/40; G06T 5/50; G06T 5/73; G06T 9/00; G06T 2207/20182; G06T 2207/20208; G06T 2207/20221; G06T 2207/20084; G06N 20/00
See application file for complete search history.

(56) References Cited

U.S. PATENT DOCUMENTS

| | | | |
|---|---|---|---|
| 9,122,960 B2 | 9/2015 | Lin et al. | |
| 2019/0171908 A1 | 6/2019 | Salavon | |
| 2020/0311981 A1* | 10/2020 | Hiasa | G06N 3/0464 |
| 2021/0142148 A1 | 5/2021 | Wang et al. | |

(Continued)

FOREIGN PATENT DOCUMENTS

| | | |
|---|---|---|
| CN | 101431605 | 5/2009 |
| CN | 102811355 | 12/2012 |

(Continued)

OTHER PUBLICATIONS

"Office Action of Taiwan Counterpart Application", issued on Jan. 5, 2023, p. 1-p. 7.

(Continued)

*Primary Examiner* — Phuoc Tran
(74) *Attorney, Agent, or Firm* — JCIPRNET

(57) ABSTRACT

An image processing method and an image processing apparatus are provided. In the method, first encoding is performed on an input image, to output a first noisy image. De-noising is performed on the first noisy image, to output a first de-noised image. De-noising is performed on the input image according to the first de-noised image, to output a first image.

26 Claims, 15 Drawing Sheets

(56) References Cited

U.S. PATENT DOCUMENTS

| | | | | |
|---|---|---|---|---|
| 2022/0287671 A1 * | 9/2022 | Huang | ................... | A61B 6/037 |
| 2023/0393278 A1 * | 12/2023 | Cambareri | ............ | G01S 17/894 |
| 2024/0177275 A1 * | 5/2024 | Ferrés | ....................... | G06T 5/70 |

FOREIGN PATENT DOCUMENTS

| | | |
|---|---|---|
| CN | 106023220 | 10/2018 |
| CN | 109886892 | 6/2019 |
| CN | 111311524 | 6/2020 |
| CN | 112204617 | 1/2021 |
| CN | 112967195 | 6/2021 |
| TW | 201832179 | 9/2018 |
| TW | 202134997 | 9/2021 |
| WO | 2012122421 | 9/2012 |

OTHER PUBLICATIONS

"Office Action of China Counterpart Application", issued on Apr. 28, 2025, p. 1-p. 10.

* cited by examiner

| Y00 = (Y0000 + Y0001 + Y0010 + Y0011) / 4 |
|---|
| Y01 = (Y0100 + Y0101 + Y0110 + Y0111) / 4 |
| Y10 = (Y1000 + Y1001 + Y1010 + Y1011) / 4 |
| Y11 = (Y1100 + Y1101 + Y1110 + Y1111) / 4 |
| U = (U00 + U01 + U10 + U11) / 4 |
| V = (V00 + V01 + V10 + V11) / 4 |

Figures 14A, 14B:
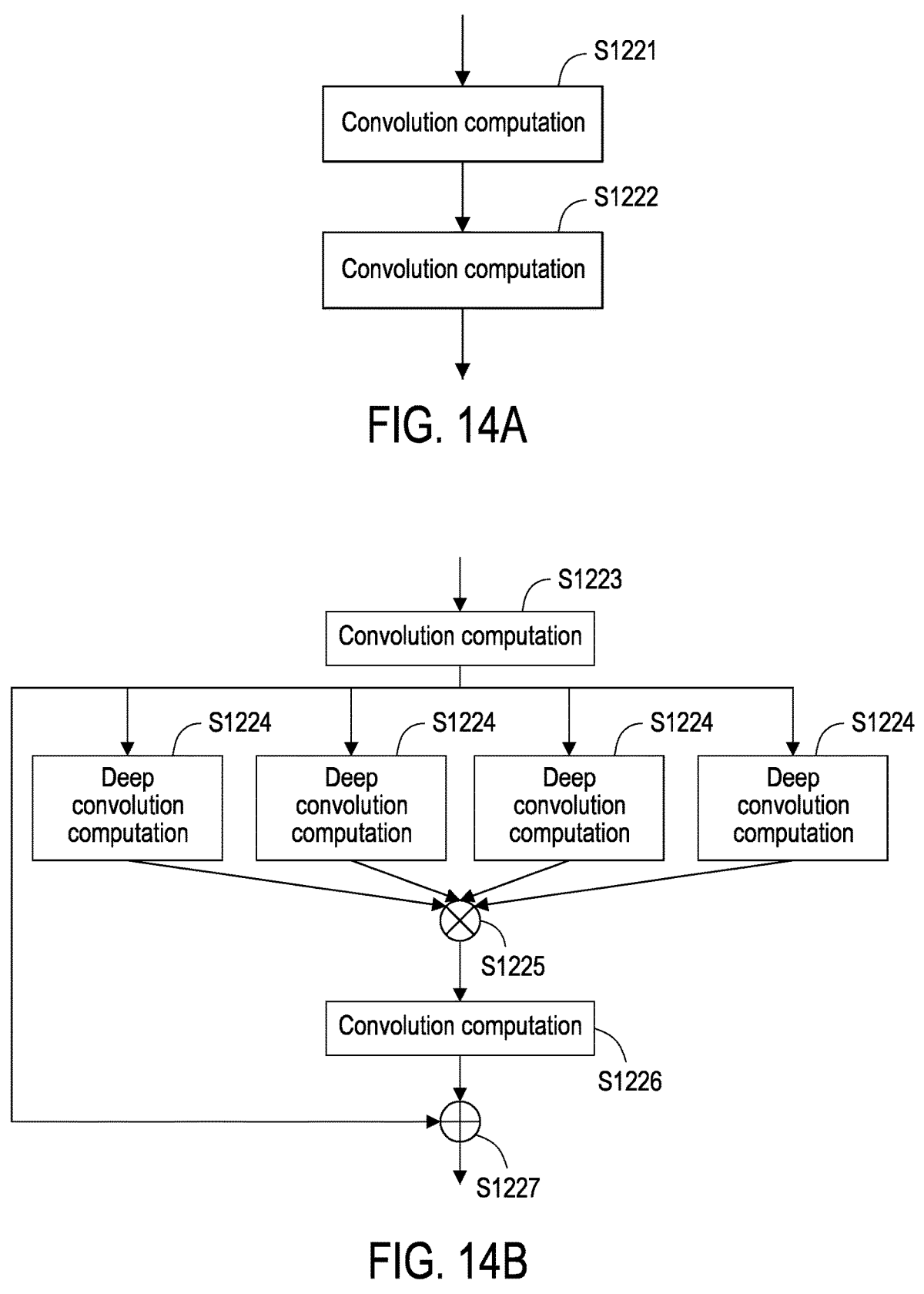

S1221

Convolution computation

S1222

Convolution computation

Convolution computation

S1224

Deep convolution computation

S1224

Deep convolution computation

S1224

Deep convolution computation

S1224

Deep convolution computation

S1225

Convolution computation

Convolution computation

S1032

Average computation

S1033

Encoding

S1034

Multiplying

S1035

Convolution computation

S1036

Encoding

S1037

Encoding

S1038

Encoding

S1039

Encoding

IMAGE PROCESSING METHOD AND IMAGE PROCESSING APPARATUS

CROSS-REFERENCE TO RELATED APPLICATION

This application claims the priority benefit of U.S. provisional application Ser. No. 63/276,666, filed on Nov. 8, 2021. The entirety of the above-mentioned patent application is hereby incorporated by reference herein and made a part of this specification.

BACKGROUND

Technical Field

The disclosure relates to an image processing technology, and in particular relates to an image processing method and an image processing apparatus.

Description of Related Art

With the improvement of display and network technology, the demand for high-definition images is gradually increasing. Image quality may be degraded during capture, conversion, and/or transmission. Today, image post-processing may be used to restore or even enhance image quality.

SUMMARY

In view of this, embodiments of the disclosure provide an image processing method and an image processing apparatus, which may process images according to thumbnail images, thereby improving image quality.

The image processing method of the embodiment of the disclosure includes (but is not limited to) the following operation. A first encoding is performed on an input image, to output a first noisy image. The first noisy image is de-noised, to output a first de-noised image. The input image is de-noised according to the first de-noised image, to output a first image.

The image processing apparatus of the embodiment of the disclosure includes (but is not limited to) a memory and a processor. The memory is used to store program code. The processor is coupled to the memory. The processor is configured to load and execute the program code to perform a first encoding on an input image to output the first noisy image, to de-noise the first noisy image to output a first de-noised image, and to de-noise the input image according to the first de-noised image to output a first image.

The image processing method of the embodiment of the disclosure includes (but is not limited to) the following operation. A standard dynamic range image is input into a space to depth conversion to convert an image data format, and first image data is output. The first image data is input into a first encoding computation, to output second image data. The second image data is input into a global computation, to output third image data. The second image data and the third image data are input into a first decoding computation, to output fourth image data. The first image data and the fourth image data are input to a second decoding computation, to output a high dynamic range image.

Based on the above, according to the image processing method and the image processing apparatus of the embodiments of the disclosure, the input image is de-noised by referring to the encoded de-noised image. In this way, the image quality may be effectively improved.

In order to make the above-mentioned features and advantages of the disclosure comprehensible, embodiments accompanied with drawings are described in detail below.

BRIEF DESCRIPTION OF THE DRAWING

FIG. 14A is a flowchart of a convolution computation according to an embodiment of the disclosure.

FIG. 14B is a flowchart of a convolution computation according to an embodiment of the disclosure.

DETAILED DESCRIPTION OF DISCLOSED EMBODIMENTS

Figure 1:
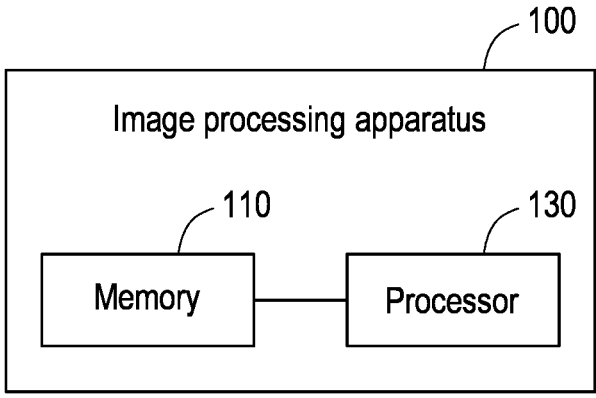
FIG. 1 is a component block diagram of an image processing apparatus according to an embodiment of the disclosure.

FIG. 1 is a component block diagram of an image processing apparatus 100 according to an embodiment of the disclosure. Referring to FIG. 1, the image processing apparatus 100 may be a smart phone, a tablet computer, a server, a wearable device, a smart home appliance, or other types of electronic devices. The image processing apparatus 100 includes (but is not limited to) a memory 110 and a processor 130.

The memory 110 may be any type of fixed or movable random access memory (RAM), read only memory (ROM), flash memory, conventional hard disk drive (HDD), solid-state drive (SSD) or similar components. In one embodiment, the memory 110 is used to record program code, software modules, configuration, data or files (e.g., raw images, input images, processed images, combined images, and output images).

The processor 130 is coupled to the memory 110. The processor 130 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar components, or combinations of components thereof. In one embodiment, the processor 130 is used to execute all or some of the computations of the image processing apparatus 100, and may load and execute each program code, software module, file, and data stored in the memory 110.

Hereinafter, the method according to the embodiment of the disclosure is described in conjunction with various apparatuses, components, and modules in the image processing apparatus 100. Each process of the method may be adjusted according to the implementation, and is not limited to thereto.

Figure 2:
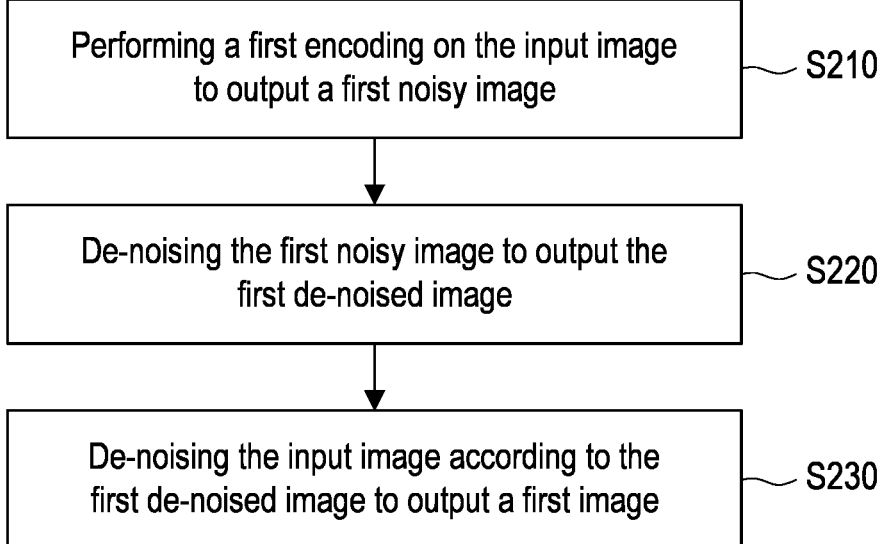
FIG. 2 is a flowchart of an image processing method according to an embodiment of the disclosure.

FIG. 2 is a flowchart of an image processing method according to an embodiment of the disclosure. Referring to FIG. 2, the processor 130 performs a first encoding on the input image to output a first noisy image (step S210). Specifically, the input image may be a medical image, a monitoring image, a product image, or a portrait image, but the type of the input image is not limited in the embodiment of the disclosure. In addition, the input image may be in red, green, and blue (RGB) format or luminance, chrominance, and density (YUV) format, which is not limited in the disclosure.

In an embodiment, the first encoding includes a first downsampling. The first downsampling is a process for reducing the width and/or height of the feature map (e.g., the input image). In one embodiment, the first downsampling is average pooling. Pooling performs specific computations through filters (or kernels). For example, average pooling is an average computation, and max pooling is an computation of picking the largest. It is worth noting that the pixels covered by sliding the filter do not overlap the pixels covered previously. In another embodiment, the first downsampling is max pooling. In other embodiments, the first downsampling may be other processes for downscaling the feature map. Therefore, the width and/or height of the first noisy image is smaller than that of the input image.

The processor 130 de-noises the first noisy image to output the first de-noised image (step S220). Specifically, de-noising (or noise reduction) is used to remove unwanted noise from an image, which may improve image clarity and cleanliness. In one embodiment, the processor 130 may use the noise detection models based on machine learning algorithms (e.g., deep neural network (DNN), multi-layer perceptron (MLP), support vector machine (SVM) or other machine learning models) to identify the noise information in the image. The noise information is, for example, the probability of each pixel being noise or the determination of whether each pixel is noise. The noise detection model is a machine learning model trained based on training samples (and labeled results). For example, a noise detection model includes one or more convolution computations, and each convolution computation uses a trained filter. The processor 130 may remove or reduce noise in the feature map (e.g., the input image) based on the noise information.

In another embodiment, the processor 130 may directly remove or reduce the noise in the feature map through a de-noising model based on a machine learning algorithm. In other embodiments, the de-noising may also be smoothing or frequency domain filtering.

The processor 130 de-noises the input image according to the first de-noised image to output a first image (step S230). Specifically, the de-noising technology may refer to the related description of step S220 and is not repeated herein. It should be noted that, in step S230, the processor 130 also refers to the first de-noised image to perform de-noising. That is, the processor 130 refers to the de-noised image that is smaller in width and/or height than the input image, and de-noises the input image.

In one embodiment, the processor 130 may combine the first de-noised image and the input image to output the first combined image. For example, the processor 130 may assign the first de-noised image and the input image to different channels, and use the set of these channels as the first combined image. Taking the red, green, and blue (RGB) format as an example, the intensity values of red, green, and blue of a certain pixel of the first de-noised image are in the first channel to the third channel, and the intensity values of red, green, and blue of the corresponding pixel of the input image are in the fourth channel to the sixth channel. However, other assignments are possible depending on the format or number of channels.

Next, the processor 130 may perform one or more convolution computations on the first combined image to output the first image. In one embodiment, the first combined image undergoes the convolution computations to output noise information (e.g., through a noise detection model), and the processor 130 may de-noise the input image according to the noise information. In another embodiment, the first combined image undergoes one or more convolution computations to output the first image directly (e.g., through a de-noise model).

Figures 3, 4:
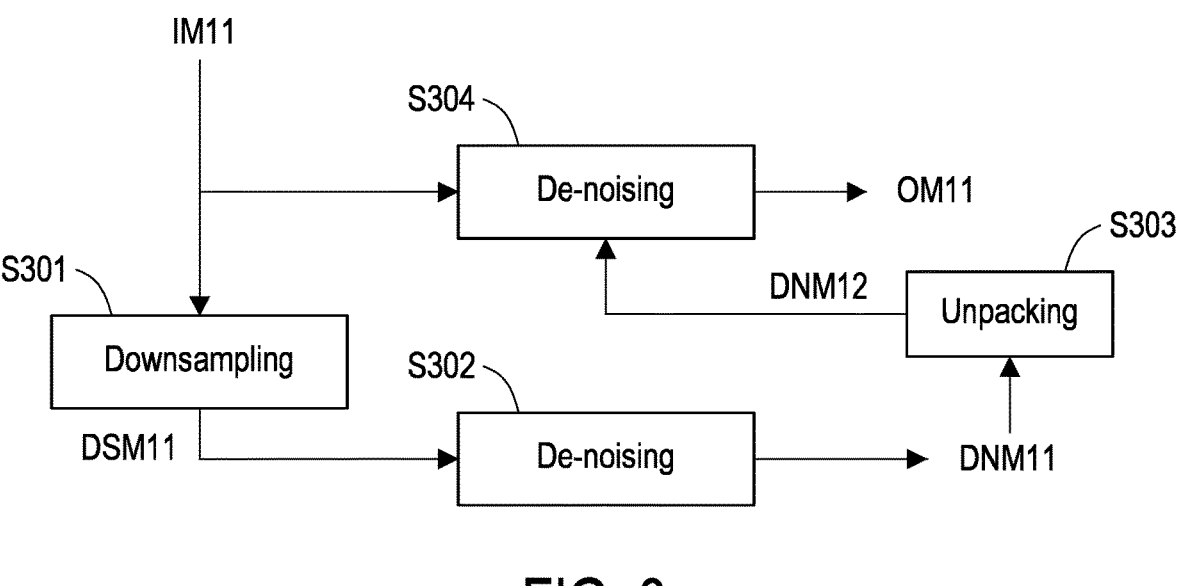
FIG. 3 is a schematic flowchart of de-noising processing according to an embodiment of the disclosure.
FIG. 4 is a schematic flowchart of de-noising processing according to an embodiment of the disclosure.

For example, FIG. 3 is a schematic flowchart of de-noising processing according to an embodiment of the disclosure. Referring to FIG. 3, the processor 130 performs a first encoding (e.g., average pooling) on the input image IM11 (configured with a width×height×channel of W/2×H/2×6, in which W is the width of the raw image and H is the height of the raw image) (step S301), and outputs a first noisy image DSM11 (configured with a width×height×channel of W/4×H/4×6). The processor 130 directly de-noises the first noisy image DSM11 (step S302), and outputs the first de-noised image DNM11 (configured with a width×height×channel of W/4×H/4×6). The processor 130 unpacks the first de-noised image DNM11 (step S303), and outputs the first de-noised image DNM12 (configured with a width×height×channel of W/2×H/2×3). The processor 130 de-noises the input image IM11 according to the first de-noised image DNM12 (step S304), and outputs the first image OM11 (configured with a width×height×channel of W/2×H/2×6). In this embodiment, the aforementioned unpacking procedure is, for example, a format conversion.

In one embodiment, the processor 130 may perform the first encoding on the $i^{th}$ noisy image to output the $i+1^{th}$ noisy image, in which i is a positive integer greater than zero from 1 to M−1, and M is the number of stages. For example, if i is 2, the processor 130 performs the first encoding on the second noisy image to output the third noisy image. The rest are analogous, and are not repeated herein.

Next, the processor 130 may de-noise the $i+1^{th}$ noisy image to output the $i+1^{th}$ de-noised image. Similarly, de-noised images with smaller width and/or height are referenced, and de-noising is performed on images that have not been de-noised. For example, if i is 3 and M is 5, the processor 130 may de-noise the fourth noisy image to output the fourth de-noised image.

For example, FIG. 4 is a schematic flowchart of de-noising processing according to an embodiment of the disclosure. Referring to FIG. 4, the processor 130 performs a first encoding (e.g., average pooling) on the input image IM11 (configured with a width×height×channel of W/2×H/2×6, in which W is the width of the raw image and H is the height of the raw image) (step S401), and outputs a first noisy image DSM11 (configured with a width×height×channel of W/4×H/4×6). The processor 130 performs a first encoding (e.g., average pooling) on the first noisy image DSM11 (step S402), and outputs a second noisy image DSM12 (configured with a width×height×channel of W/8×H/8×6). The processor 130 directly de-noises the second noisy image DSM12 (step S403), and outputs the second de-noised image DNM21 (configured with a width×height×channel of W/8×H/8×6). The processor 130 unpacks the second de-noised image DNM21 (step S404), and outputs the second de-noised image DNM22 (configured with a width×height×channel of W/4×H/4×3). The processor 130 de-noises the first noisy image DSM11 according to the second de-noised image DNM22 (step S405), and outputs the first de-noised image DNM15 (configured with a width×height×channel of W/4×H/4×6). The processor 130 unpacks the first de-noised image DNM11 (step S406), and outputs the first de-noised image DNM23 (configured with a width×height×channel of W/2×H/2×3). The processor 130 de-noises the input image IM11 according to the first de-noised image DNM23 (step S407), and outputs the first image OM12 (configured with a width×height×channel of W/2×H/2×6).

It should be noted that the embodiments of the disclosure are not limited to the two-stage optimization shown in FIG. 3 or the three-stage optimization shown in FIG. 4, stages such as four-stage (i.e., M is 4), five-stage (i.e., M is 5) or higher may also be implemented.

As mentioned above, in this embodiment, the image formats of the input image and the first image are, for example, the luminance, chrominance, and density (YUV) format, but not limited thereto. In other preferred embodiments, the image formats of the input image and the first image may also be in red, green, and blue (RGB) format, which is not limited in the disclosure.

In another preferred embodiment, before performing the de-noising processing as shown in FIG. 3 or FIG. 4, the input image, for example, undergoes a third encoding conversion processing in advance, so as to convert the image format of a raw image (configured with a width×height×channel of W×H×3) to the image format of the input image (configured with a width×height×channel of W/2×H/2×6). That is to say, the input image is, for example, an image of the raw image that has undergone the third encoding. For example, the image formats of the raw image and the input image may be both luminance and chrominance, and density formats, in which the image format of the raw image may be YUV444, and the image format of the input image may be YUV420. The image format of YUV444 may be converted into the image format of YUV420 after the third encoding such as a format conversion. Of course, in other preferred embodiments, the image format of the raw image may also be the red, green, and blue (RGB) format, and the image format of the input image may be the image format of YUV420. In this embodiment, the aforementioned format conversion is, for example, a packing program.

It is worth mentioning that, in the aforementioned embodiment in which the input image has undergone the conversion processing of the third encoding in advance, after outputting the first image (configured with a width× height×channel of W/2×H/2×6), the processor 130 may unpack the first image again, and output the first image (the configured with a width×height×channel of W×H×3). In other embodiments in which the input image has undergone the conversion processing of the third encoding in advance, after outputting the first image (configured with a width× height×channel of W/2×H/2×6), the first image may also be adjusted in a subsequent image processing program without undergoing the unpacking procedure of the processor 130, so that the final output image has a width×height×channel configuration of W×H×3.

As can be seen from the description above, whether or not the input image has undergone the conversion processing of the third encoding in advance belongs to the spirit and scope of the disclosure, and is not limited herein.

Figures 5, 6:
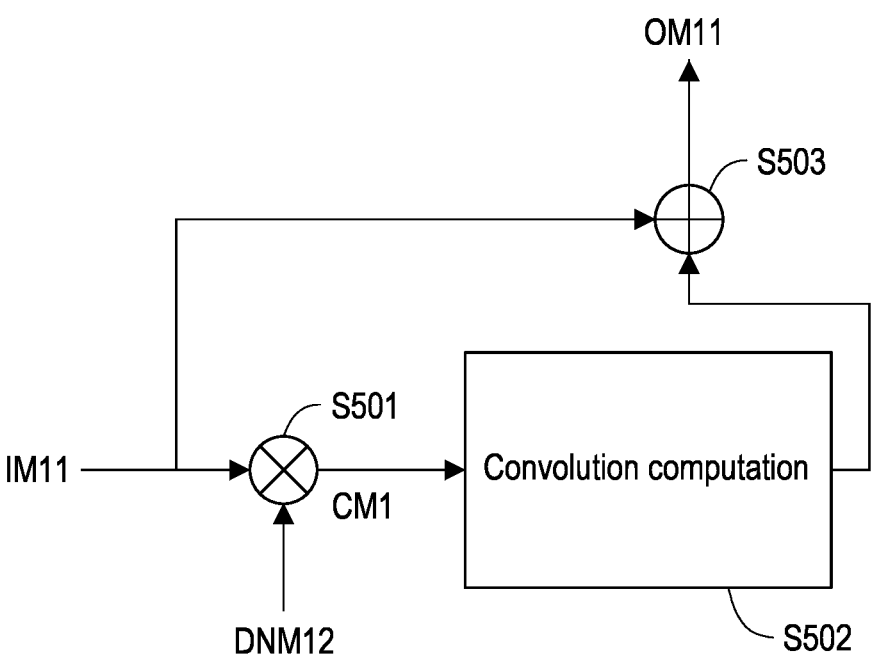
FIG. 5 is a flowchart for de-noising blocks according to an embodiment of the disclosure.
FIG. 6 is a schematic diagram of a first pixel of a raw image according to an embodiment of the disclosure.

FIG. 5 is a flowchart for the de-noising block according to an embodiment of the disclosure. Referring to FIG. 5, taking step S304 of FIG. 3 as an example (it may also be step S405 or step S407 of FIG. 4), the processor 130 may combine the input image IM11 and the first de-noised image DNM12 (step S501), and output the first combined image CM1. The processor 130 may perform multiple convolution computations on the first combined image CM1 (step S502), and output the noise information. Next, the processor 130 may de-noise the input image IM11 according to the noise information (step S503), and output the first image OM11.

In one embodiment, the raw image may also undergo a pixel assigning computation in advance by the processor 130. Taking the luminance, chrominance, and density (YUV) format as an example, the processor 130 may respectively assign the luminance values of the adjacent 2×2 first pixels in the raw image to four of the six channels of the second pixel in the input image, assign the chrominance values of the adjacent 2×2 first pixels in the raw image to one of the six channels of the second pixel in the input image, and assign the density values of the adjacent 2×2 first pixels in the raw image to one of the six channels of the second pixel in the input image. Thereby, the computation of reassigning the pixels of the raw image is achieved. Specifically, the processor 130 records the luminance value, the chrominance value, and the density value of any first pixel in the raw image in three channels. If the dimension is to be reduced, the processor 130 records the luminance values of adjacent 2×2 first pixels in the four channels of a certain second pixel of the input image, and respectively records the chrominance values and density values (e.g., taking the average value, maximum value, or other statistical value) of the first pixels in the two channels of the input image corresponding to the second pixel.

Figures 7A, 7B:
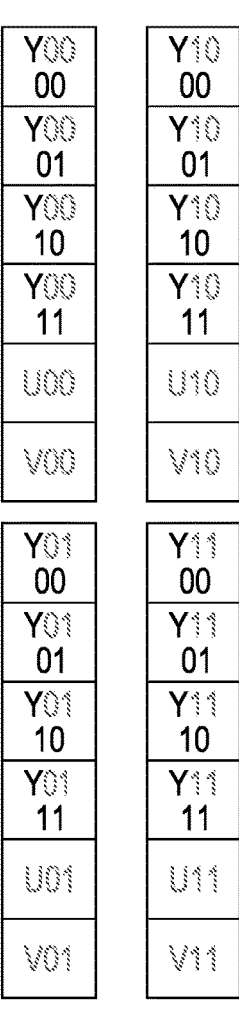
FIG. 7A is a schematic diagram of a second pixel of an input image according to an embodiment of the disclosure.
FIG. 7B is a schematic diagram of average pooling according to an embodiment of the disclosure.

For example, FIG. 6 is a schematic diagram of a first pixel of a raw image according to an embodiment of the disclosure, and FIG. 7A is a schematic diagram of a second pixel of an input image according to an embodiment of the disclosure. Referring to FIG. 6 and FIG. 7A, the 2×2 first pixels on the upper left of FIG. 6 are assigned to the second pixel numbered "00" in the input image (as shown in FIG. 7A including the luminance values Y0000, Y0001, Y0010, Y0011, the representative chrominance value U00, and the density value V00 of the 2×2 first pixels); the 2×2 first pixels in the upper right of FIG. 6 are assigned to the second pixel numbered "10" in the input image (as shown in FIG. 7A including the luminance values Y1000, Y1001, Y1010, Y1011, the representative chrominance value U10, and the density value V10 of the 2×2 first pixels); the 2×2 first pixels in the lower left of FIG. 6 are assigned to the second pixel numbered "01" in the input image (as shown in FIG. 7A including the luminance values Y0100, Y0101, Y0110, Y0111, the representative chrominance value U01, and the density value V01 of the 2×2 first pixels); the 2×2 first pixels in the lower right of FIG. 6 are assigned to the second pixel numbered "11" in the input image (as shown in FIG. 7A including the luminance values Y1100, Y1101, Y1110, Y1111, the representative chrominance value U11, and the density value V11 of the 2×2 first pixels).

It should be noted that the width and height of the reassigned raw image are not limited to 2×2 first pixels, sizes such as 4×4, 3×3 or others may also be implemented.

In one embodiment, the processor 130 may perform a pooling processing on adjacent 2×2 second pixels in the input image. The pooling processing may perform a specific computation (e.g., taking a maximum value or an average value) on the second pixel within a specific area (e.g., a 2×2 area).

For example, FIG. 7B is a schematic diagram of average pooling according to an embodiment of the disclosure. Referring to FIG. 7A and FIG. 7B, the first channel of a certain pixel of the first noisy image is the luminance value Y00 obtained by averaging the four luminance values Y0000, Y0001, Y0010, and Y0011 of the second pixel numbered "00"; the second channel is the luminance value Y01 obtained by averaging the four luminance values Y0100, Y0101, Y0110, and Y0111 of the second pixel numbered "01"; the third channel is the luminance value Y10 obtained by averaging the four luminance values Y1000, Y1001, Y1010, and Y1011 of the second pixel numbered "10"; the fourth channel is the luminance value Y11 obtained by averaging the four luminance values Y1100, Y1101, Y1110, and Y1111 of the second pixel numbered "11"; the fifth channel is the chrominance value U obtained by averaging the chrominance values U00, U01, U10, and U11 of the four second pixels numbered "00", "01", "10", and "11"; the sixth channel is the chrominance value V obtained by averaging the density values V00, V01, V10, and V11 of the four second pixels numbered "00", "01", "10", and "11".

It should be noted that the area targeted by the pooling processing is not limited to 2×2 first pixels, sizes such as 4×4, 3×3 or other sizes may also be implemented.

In one embodiment, the processor 130 may reassign the third pixel of the $i^{th}$ de-noised image to increase the dimension (e.g., step S303 in FIG. 3, step S404 and step S406 in FIG. 4). Taking the YUV format as an example, the processor 130 may respectively assign four of the six channels of the third pixel in the $i^{th}$ de-noised image corresponding to the luminance values to four fourth pixels in the unpacked image (e.g., the first de-noised image DNM12 of FIG. 3, the second de-noised image DNM22 of FIG. 4, or the first de-noised image DNM23 of FIG. 4), respectively assign one of the six channels of the third pixel in the $i^{th}$ de-noised image corresponding to the chrominance value to the four fourth pixels in the unpacked image, and respectively assign one of the six channels of the third pixel in the $i^{th}$ de-noised image corresponding to the density value to the four fourth pixels in the unpacked image.

Specifically, the processor 130 records the luminance value, the chrominance value, and the density value of any third pixel in the $i^{th}$ de-noised image in six channels (as shown in FIG. 7A). If the dimension is to be increased, the processor 130 respectively records the luminance values of the four channels of the single third pixel in one channel of the four fourth pixels of the unpacked image, and respectively records the chrominance value and the density value of the third pixel in two channels of the four fourth pixels of the input image (i.e., the four fourth pixels have the same chrominance value and the same density value).

Figure 8:
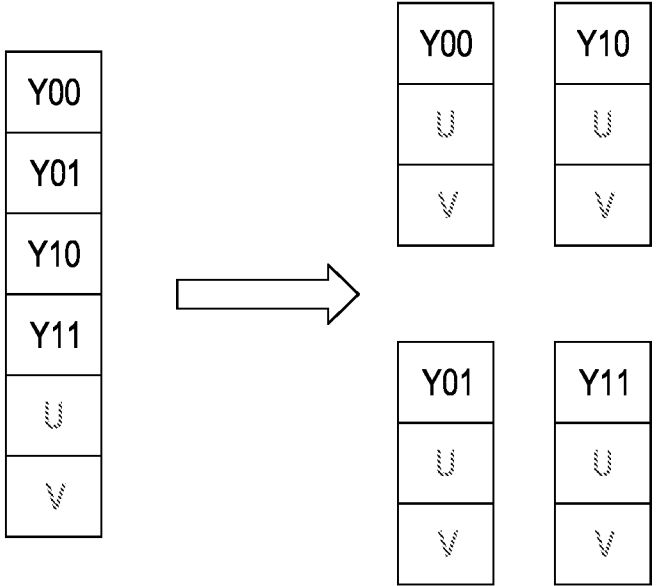
FIG. 8 is a schematic diagram of pixel unpacking according to an embodiment of the disclosure.

For example, FIG. 8 is a schematic diagram of pixel unpacking according to an embodiment of the disclosure. Referring to FIG. 8, the luminance values Y00, Y01, Y10, and Y11 of four channels of the third pixel in FIG. 7B are assigned to one channel of the four fourth pixels, the chrominance value U of one channel of the third pixel is assigned to one channel of the four fourth pixel, and the density value V of one channel of the third pixel is assigned to one channel of the four fourth pixels.

It should be noted that, in the foregoing embodiments, the luminance, chrominance, and density (YUV) format is used as an illustration, but the red, green, and blue (RGB) format may also be used in other embodiments.

In one embodiment, the processor 130 may sharpen the $i^{th}$ noisy image to output the $i^{th}$ sharpened image. Sharpening is used to enhance the edge contours of an image, which may improve image clarity and cleanliness. In one embodiment, the processor 130 may sharpen the $i^{th}$ noisy image through a sharpening model based on a machine learning algorithm. For example, a sharpening model includes one or more convolution computations, and each convolution computation uses a trained filter. In another embodiment, the processor 130 may use a high pass filter, unsharp masking, or other edge sharpening processing.

Next, the processor 130 may sharpen the input image according to the $i^{th}$ sharpened image to output the first image. Similarly, sharpened images with smaller width and/or height are referenced, and sharpening is performed on images that has not been sharpened. In one embodiment, the processor 130 may combine the $i^{th}$ sharpened image and the input image, and perform one or more convolution computations on the combined image to output the first image.

It should be noted that sharpening and de-noising may be performed simultaneously or separately.

In addition to sharpening and de-noising, high dynamic range (HDR) processing is also widely used in image processing. High dynamic range facilitates in enhancing the visual experience.

Figure 9A:
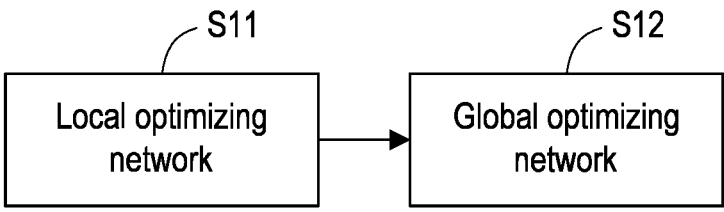
FIG. 9A is a flowchart of a two-stage network optimization according to an embodiment of the disclosure.

FIG. 9A is a flowchart of a two-stage network optimization according to an embodiment of the disclosure. Referring to FIG. 9A, the processor 130 may perform local optimizing network (LON) (step S11). Next, the processor 130 may perform global optimizing network (GON) on the output of the local optimizing network (step S12). The local optimization network in step S11 may be used for the aforementioned sharpening and de-noising, and may be implemented by the aforementioned sharpening and de-noising related embodiments, for example, the steps shown in FIG. 2, and the architecture shown in FIG. 3 or FIG. 4. The global optimizing network in step S12 may be used for high dynamic range processing, and detailed embodiments thereof are described in subsequent embodiments.

Figure 9B:
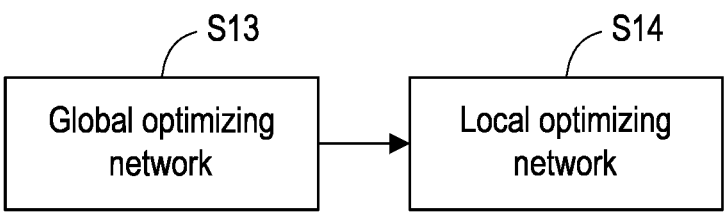
FIG. 9B is a flowchart of a two-stage network optimization according to another embodiment of the disclosure.

However, the two-stage network is not limited to the sequence shown in FIG. 9A. FIG. 9B is a flowchart of a two-stage network optimization according to another embodiment of the disclosure. Referring to FIG. 9B, the processor 130 may firstly perform the global optimizing network (step S13). Next, the processor 130 may perform a local optimizing network on the output of the global optimizing network (step S14). The local optimization network in step S13 may be used for the aforementioned sharpening and de-noising, and may be implemented by the aforementioned sharpening and de-noising related embodiments. For example, the steps shown in FIG. 2, the architecture shown in FIG. 3 or FIG. 4. The global optimizing network in step S14 may be used for high dynamic range processing, and detailed embodiments thereof are described in subsequent embodiments.

Figure 9C:
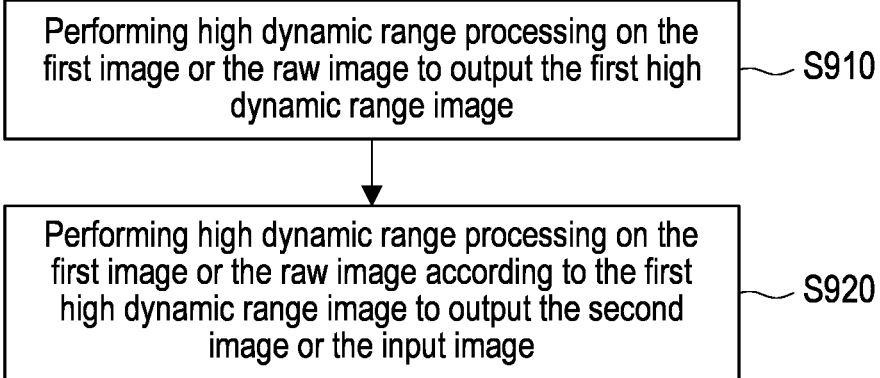
FIG. 9C is a flowchart of an image processing method according to an embodiment of the disclosure.

For high dynamic range processing, FIG. 9C is a flowchart of an image processing method according to an embodiment of the disclosure. Referring to FIG. 9C, the processor 130 may perform high dynamic range processing on the first image (the output of step S11 in FIG. 9A) or the raw image (the input of step S13 in FIG. 9B) to output the first high dynamic range image (step S910). Specifically, high dynamic range processing is used to increase the dynamic range of exposures and possibly correctly represent the wide luminance range from the light source to the darkest shadow in the real world. In one embodiment, the processor 130 may use the intensity mapping models based on machine learning algorithms (e.g., deep neural network (DNN), multi-layer perceptron (MLP), support vector machine (SVM) or other machine learning models) to identify the enhancement information in the image. The enhancement information is, for example, the intensity value (e.g., the luminance value, the contrast value, or the hue) corresponding to each pixel or the determination to adjust the intensity. The intensity mapping model is a machine learning model trained based on training samples (and labeled results). For example, an intensity mapping model includes one or more convolution computations, and each convolution computation uses a trained filter. The processor 130 may perform high dynamic range processing based on the enhancement information. That is, the intensity value (e.g., the luminance value, the contrast value, or the hue) of the feature map (e.g., the first image or the raw image) is adjusted.

In another embodiment, the processor 130 may directly perform high dynamic range processing on the feature map through a high dynamic range model based on a machine learning algorithm. In other embodiments, the processor 130 may use other high dynamic range algorithms.

The first image is, for example, the first image OM11 in FIG. 3 or the first image OM12 in FIG. 3, but may also be the output of other local optimization networks. The raw image may be a medical image, a monitoring image, a product image, or a portrait image, but the type of the input image is not limited in this embodiment of the disclosure.

The processor 130 performs high dynamic range processing on the first image according to the first high dynamic range image to output the second image (step S920). Specifically, the high dynamic range technology may refer to the related description of step S910 and is not repeated herein. It should be noted that, in step S920, the processor 130 also refers to the first high dynamic range image to perform high dynamic range processing. That is, the processor 130 refers to the high dynamic range image that is smaller in width and/or height than the first image, and performs high dynamic range processing on the first input image.

In one embodiment, when the processor 130 performs high dynamic range processing on the first image, the processor 130 performs high dynamic range processing on the first image according to the first high dynamic range image to output the second image. Taking FIG. 9A as an example, the output of step S11 is a first image, and in step S12, high dynamic range processing may be performed on the first image according to the first high dynamic range image to output a second image. In another embodiment, when the processor 130 performs high dynamic range processing on the raw image, the processor 130 performs high dynamic range processing on the raw image according to the first high dynamic range image to generate the input image, then the first encoding computation as shown in FIG. 3 or FIG. 4 is performed on the input image. Taking FIG. 9B as an example, the input in step S13 is a raw image, and in step S13, high dynamic range processing may be performed on the raw image according to the first high dynamic range image to output the input image.

Here, the high dynamic range processing of the global optimizing network shown in FIG. 9A is described first. In one embodiment, the processor 130 may combine the first high dynamic range image and the first image to output the second combined image. For example, the processor 130 may assign the first high dynamic range image and the first image to different channels, and use the set of these channels as the second combined image. Taking the red, green, and blue format as an example, the intensity values of red, green, and blue of a certain pixel of the first high dynamic range image are in the first channel to the third channel, and the intensity values of red, green, and blue of the corresponding pixel of the first image are in the fourth channel to the sixth channel. However, other assignments are possible depending on the format or number of channels.

Next, the processor 130 may perform one or more convolution computations on the second combined image to output the second image. In one embodiment, the second combined image undergoes the convolution computations to output enhancement information (e.g., through an intensity mapping model), and the processor 130 may adjust the intensity values of the first input image according to the enhancement information. In another embodiment, the second combined image undergoes the convolution computations to output the second image directly (e.g., through a high dynamic range model).

In one embodiment, performing depth to space conversion is further included before performing the high dynamic range processing. The depth to space conversion is used to assign multiple channels to a single channel. That is, pixels in multiple channels are merged into the same channel, and it is also possible that pixels originally in different channels are converted to be in the same channel. For example, the first pixel, the third pixel, and the fifth pixel in the first channel to the third channel are assigned to the new first channel; the second pixel, the fourth pixel, and the sixth pixel in the fourth channel to the sixth channel are assigned to the new second channel.

Figure 10:
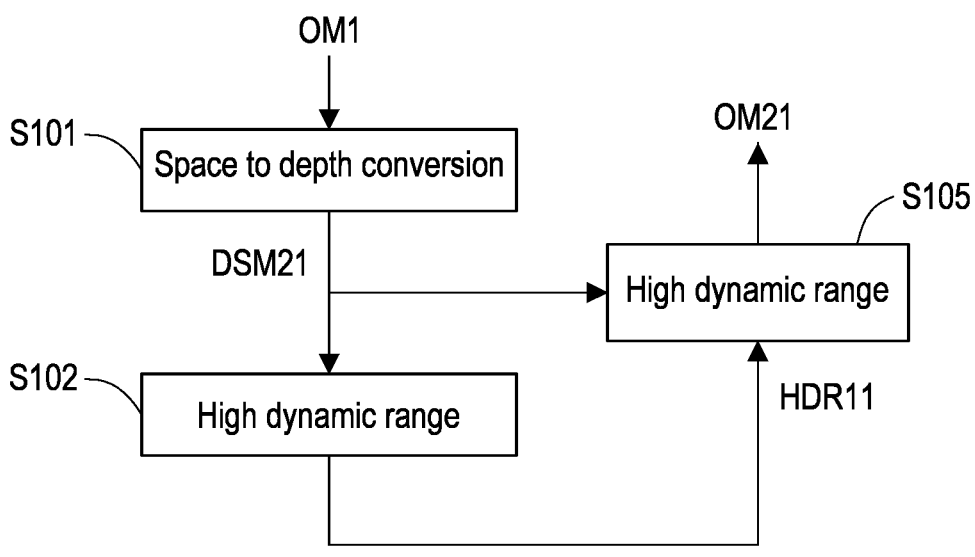
FIG. 10 is a flowchart of high dynamic range (HDR) processing according to an embodiment of the disclosure.

For example, FIG. 10 is a flowchart of high dynamic range processing according to an embodiment of the disclosure. Referring to FIG. 9A and FIG. 10 at the same time, after the processor 130 performs a local optimizing network (LON) and outputs the first image, the processor 130 performs a space to depth conversion on the first image OM1 (configured with a width×height×channel of W×H×C, in which W is the width of the first image OM1, H is the height of the first image OM1, and C is the channel of the first image OM1) (step S101), and outputs a first standard dynamic range image DSM21 (configured with a width×height×channel of W/2×H/2×4*C). The processor 130 performs high dynamic range processing on the first standard dynamic range image DSM21 (step S102), and outputs the first high dynamic range image HDR11 (configured with a width×height×channel of W/2×H/2×4*C). The processor 130 performs high dynamic range processing on the first standard dynamic range image DSM21 according to the first high dynamic range image HDR11 (step S105), and outputs a second image OM21 (configured with a width×height× channel of W×H×C).

In one embodiment, the processor 130 may define the first image as a first standard dynamic range (SDR) image. The processor 130 may perform the second encoding on the $j^{th}$ standard dynamic range image to output the $j+1^{th}$ standard dynamic range image, in which j is a positive integer from 1 to N−1, and N is the number of stages. For example, if j is 2, the processor 130 performs the second encoding on the second standard dynamic range image to output the third standard dynamic range image. The rest are analogous, and are not repeated herein. The second encoding includes pooling to reduce the image size.

The processor 130 may perform high dynamic range processing on the $j+1^{th}$ standard dynamic range image to output the $j+1^{th}$ high dynamic range image. Next, the processor 130 may perform high dynamic range processing on the $j+1^{th}$ standard dynamic range image according to the $j+1^{th}$ high dynamic range image, so as to output the $j^{th}$ high dynamic range image. Similarly, HDR images with smaller width and/or height are referenced, and HDR processing is performed on images that have not been HDR processed, in which N is the number of stages, and is a positive integer greater than two. For example, if j is 3 and N is 4, the processor 130 performs high dynamic range processing on the fourth standard dynamic range image according to the fourth high dynamic range image to output the third high dynamic range image.

In addition, when j=1, the processor 130 may perform high dynamic range processing on the second (j+1) standard dynamic range image according to the second (j+1) high dynamic range image, so as to output the first high dynamic range image, and further, the first high dynamic range image performs high dynamic range processing on the first image to output the second image.

Figure 11:
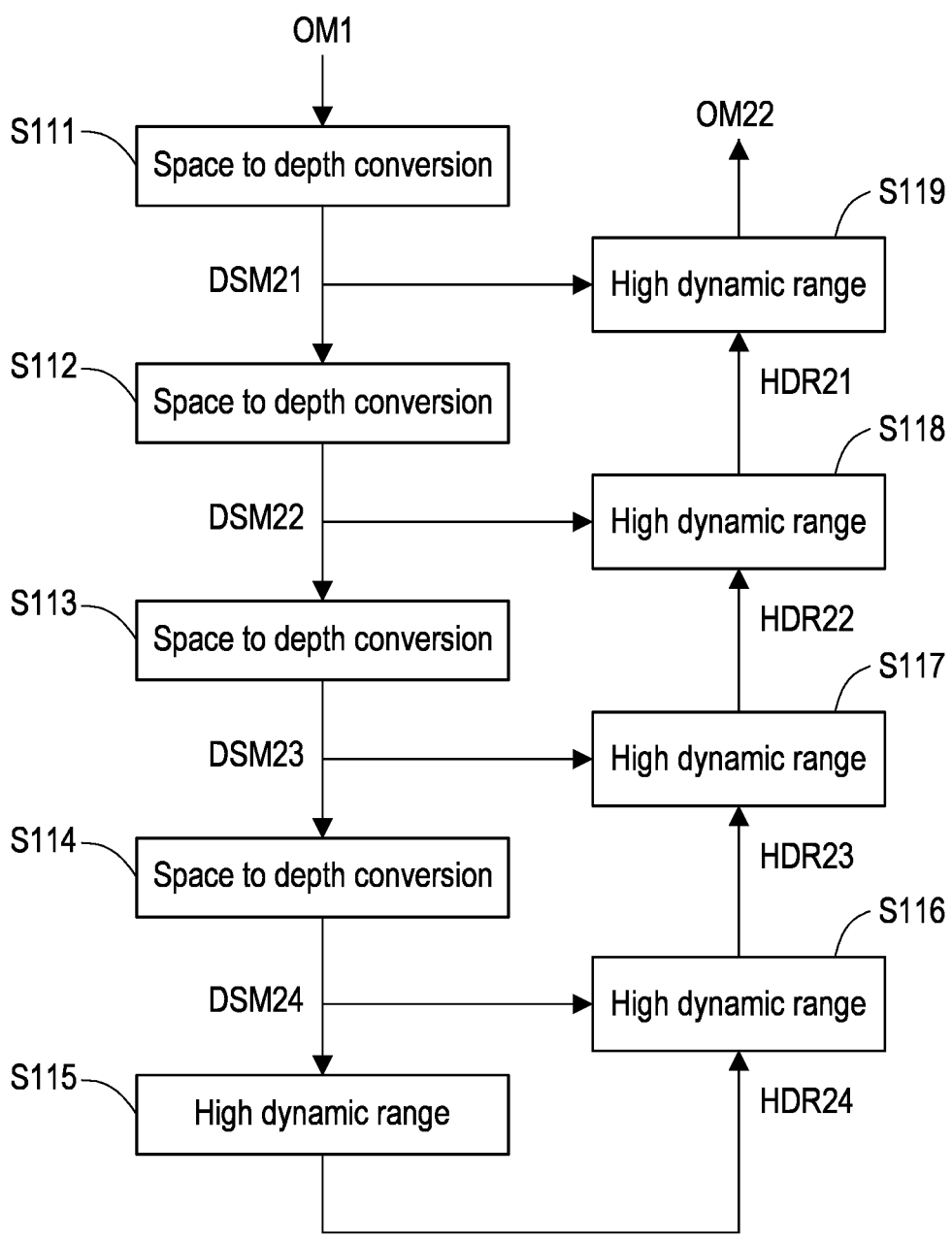
FIG. 11 is a flowchart of high dynamic range processing according to an embodiment of the disclosure.

For example, FIG. 11 is a flowchart of high dynamic range processing according to an embodiment of the disclosure. Referring to FIG. 11, the processor 130 performs space to depth conversion on the first image OM1 (configured with a width×height×channel of W×H×C, in which W is the width of the first image OM1, H is the height of the first image OM1, and C is the channel of the first image OM1) (step S111), and outputs a first standard dynamic range image DSM21 (configured with a width×height×channels of W/2× H/2×4*C). The processor 130 performs the second encoding on the first standard dynamic range image DSM21 (step S112), and outputs the second standard dynamic range image DSM22 (configured with a width×height×channel of W/4×H/4×4*C). The processor 130 performs the second encoding on the second standard dynamic range image DSM22 (step S113), and outputs the third standard dynamic range image DSM23 (configured with a width×height× channel of W/8×H/8×4*C). The processor 130 performs the second encoding on the third standard dynamic range image DSM23 (step S114), and outputs the fourth standard dynamic range image DSM24 (configured with a width× height×channel of W/16×H/16×4*C). The processor 130 directly performs high dynamic range processing on the fourth standard dynamic range image DSM24 (step S115), and outputs the fourth high dynamic range image HDR24 (configured with a width×height×channel of W/16×H/16× 4C). The processor 130 performs high dynamic range processing on the fourth standard dynamic range image DSM24 according to the fourth high dynamic range image HDR24 (step S116), and outputs a third high dynamic range image HDR23 (configured with a width×height×channel of W/8× H/8×C). The processor 130 performs high dynamic range processing on the third standard dynamic range image DSM23 according to the third high dynamic range image HDR23 (step S117), and outputs a second high dynamic range image HDR22 (configured with a width×height× channel of W/4×H/4×C). The processor 130 performs high dynamic range processing on the second standard dynamic range image DSM22 according to the second high dynamic range image HDR22 (step S118), and outputs the first high dynamic range image HDR21 (configured with a width× height×channel of W/2×H/2×C). The processor 130 performs high dynamic range processing on the first standard dynamic range image DSM21 according to the first high dynamic range image HDR21 (step S118), and outputs a second image OM22 (configured with a width×height× channel of W×H×C).

It should be noted that the embodiments of the disclosure are not limited to the two-stage optimization shown in FIG. 10 or the four-stage optimization shown in FIG. 11, stages such as three-stage (i.e., N is 3), five-stage (i.e., N is 5) or higher may also be implemented. In addition, the second encoding in the aforementioned step S112, step S113 and step S114 may also be referred to as the first encoding computation, the high dynamic range processing in step S115 may also be referred to as a global computation, and the high dynamic range processing in step S116 may also be referred to as the first decoding computation, and the high dynamic range processing in step S117, step S118, and step S119 may also be referred to as a second decoding computation.

The above is a detailed description of the implementation of first performing local optimizing network and outputting the first image, and then performing global optimizing network on the first image as shown in FIG. 9A. Next, referring to FIG. 9B and FIG. 10 at the same time, the processor 130 may first perform high dynamic range processing on the raw image (the input of step S13 in FIG. 9B) to output the input image, and then perform local optimizing network processing on the input image to output the first image. Similar to the embodiment shown in FIG. 9A, in the embodiment shown in FIG. 9B, the processor 130 also performs space to depth conversion on the raw image (not shown) (step S101), and outputs the first standard dynamic range image DSM21. The processor 130 also performs high dynamic range processing on the first standard dynamic range image DSM21 (step S102), and outputs a first high dynamic range image HDR11. Similarly, the processor 130 also performs high dynamic range processing on the first standard dynamic range image DSM21 according to the first high dynamic range image HDR11 to generate the input image. In this way, the input image may then perform, for example, a local optimizing network computation (e.g., step S14) to output the first image.

Similar to the embodiment shown in FIG. 9A, in the embodiment shown in FIG. 9B, the processor 130 may also perform the high dynamic range processing as shown in FIG. 11. For example, the raw image may be defined as a first processed image, and the second encoding may be performed on the first processed image to output a second processed image. Next, the high dynamic range processing is performed on the second processed image to output a second high dynamic range image. Next, the high dynamic range processing is performed on the second processed image according to the second high dynamic range image to output a first high dynamic range image, and further, the first high dynamic range image performs the high dynamic range processing on the raw image to output the input image. The aforementioned second encoding is, for example, a pooling processing. The embodiment shown in FIG. 9B is similar to the embodiment shown in FIG. 9A, and details are not repeated herein.

In one embodiment, the processor 130 may perform a second encoding on the first, second, or other standard dynamic range images. In one embodiment, the second encoding includes a second downsampling. The second downsampling is a process for reducing the width and/or height of the feature map (e.g., the input image). In one embodiment, the second downsampling is a desubpixel conversion. Desubpixel conversion assigns multiple pixels on a single channel to a single pixel on multiple channels. In another embodiment, the second downsampling is a pooling processing. In a preferred embodiment, the pooling processing is, for example, average pooling. That is, the average value of multiple pixels in any channel is taken. In some embodiments, the second downsampling includes desubpixel and channel average pooling. In other embodiments, the second downsampling may be other processes for downscaling the feature map. Therefore, the width and/or height of the second encoded image is smaller than that of the input first image or the raw image.

In one embodiment, the second encoding includes at least one convolution computation.

In one embodiment, the processor 130 further performs space to depth conversion on the first image or the raw image. The space to depth conversion is used to assign the first image or the raw image of a single channel to multiple channels for subsequent high dynamic range processing (step S102 in FIG. 10, or step S112 to step S119 in FIG. 11). That is, pixels in the same channel are split into more channels, and it is also possible that pixels originally in the same channel are converted to be in different channels. For example, the first pixel, the third pixel, and the fifth pixel in the first channel are assigned to the new first channel; the second pixel, the fourth pixel, and the sixth pixel in the first channel are assigned to the new second channel. In addition, the processor 130 may further perform high dynamic range processing on the first image or the raw image assigned to the multiple channels according to the first high dynamic range image to output the second image.

Figure 12:
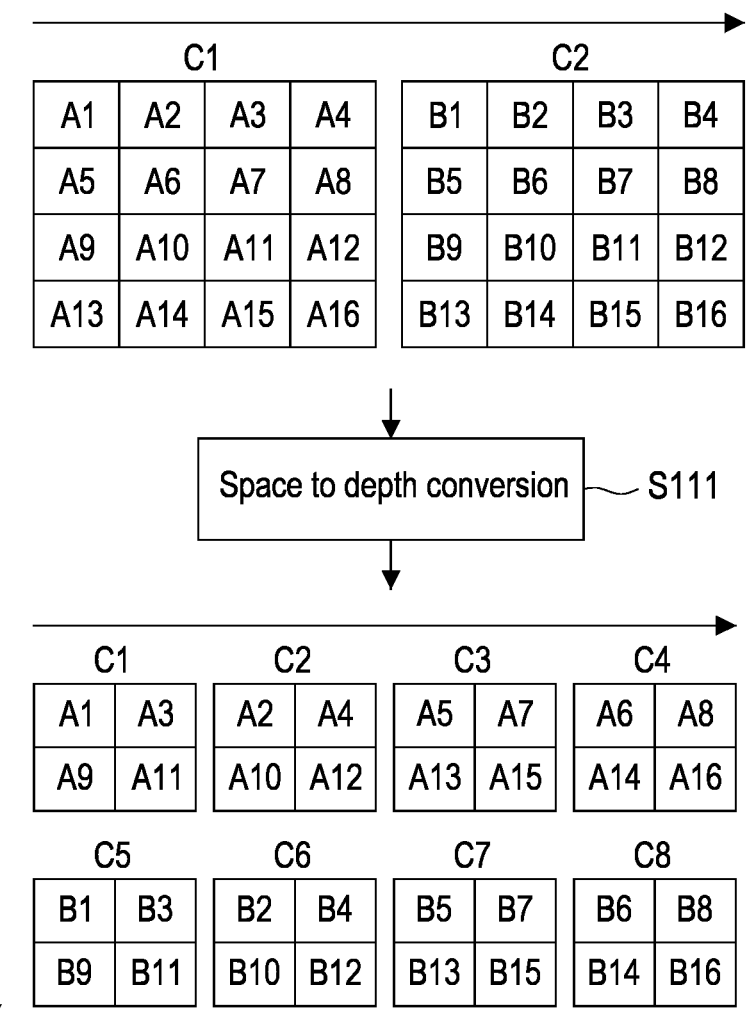
FIG. 12 is a schematic diagram of space to depth conversion according to an embodiment of the disclosure.

FIG. 12 is a schematic diagram of space to depth conversion according to an embodiment of the disclosure. Referring to FIG. 12, step S111 of FIG. 11 is taken as an example (it may also be step S101 of FIG. 10). It is assumed that the first image OM1 is configured with a width×height×channel of 4×4×2. In the space to depth conversion (step S111), the processor 130 may assign the pixels A1, A3, A9, and A11 of the channel C1 to the new channel C1, assign the pixels A2, A4, A10, and A12 of the channel C1 to the new channel C2, assign the pixels A5, A7, A13, and A15 of channel C1 to the new channel C3, assign the pixels A6, A8, A14, and A16 of the channel C1 to the new channel C4, assign the pixels B1, B3, B9, and B11 to the new channel C5, assign the pixels B2, B4, B10, and B12 of channel C2 to the new channel C6, assign the pixels B5, B7, B13, and B15 of channel C2 to the new channel C7, and assign the pixels B6, B8, B14, and B16 of channel C2 to the new channel C8. Finally, a standard dynamic range image of the first encoded sample with a width×height×channel of 2×2×8 is formed.

Figure 13:
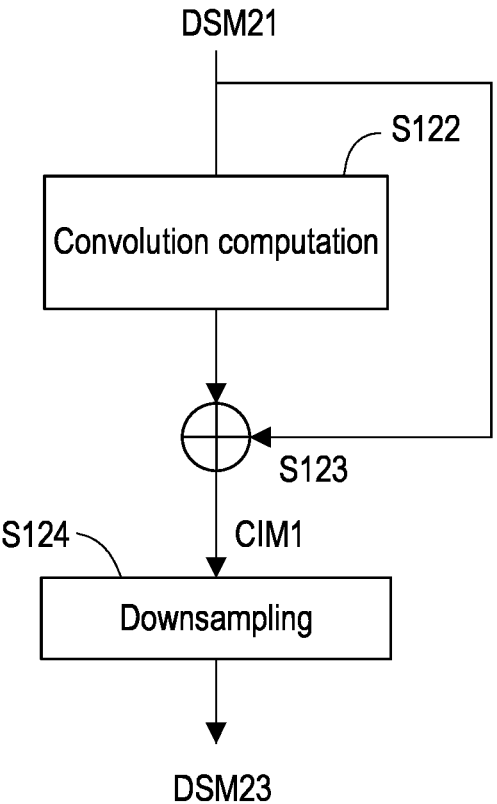
FIG. 13 is a flowchart of a second encoding according to an embodiment of the disclosure.

FIG. 13 is a flowchart of a second encoding according to an embodiment of the disclosure. Referring to FIG. 13, step S102 of FIG. 10 is taken as an example (it may also be step S112, step S113, and step S114 of FIG. 11). The processor 130 may perform one or more convolution computations on the first image OM1 or the first standard dynamic range image DSM21 to output the first channel adjusted image (step S122). The processor 130 may combine the first channel adjusted image and the image input to one or more convolution computations (e.g., the first standard dynamic range image DSM21) to output the combined image CIM1 (step S123). Next, the processor 130 may perform a second downsampling (e.g., average pooling) on the combined image CM2 to output a second standard dynamic range image DSM23 (step S124). For the average pooling, reference may be made to the descriptions of FIG. 7A and FIG. 7B, which are not repeated herein.

FIG. 14A is a flowchart of a convolution computation according to an embodiment of the disclosure. Referring to FIG. 14A, step S122 of FIG. 13 includes, for example, two convolution computations (step S1221 and step S1222).

FIG. 14B is a flowchart of a convolution computation according to an embodiment of the disclosure. Referring to FIG. 14B, step S122 of FIG. 13 includes two convolution computations (step S1223 and step S1226) and multiple deep convolution computations (step S1224). The processor 130 may respectively perform a deep convolution computation on the output of step S1223 (step S1224). The processor 130 may combine the outputs of the deep convolution computation (step S1225), and perform a convolution computation on the combined image (step S1226). Next, the processor 130 may add/superpose the outputs of step S1226 and step S1224 (step S1227).

It should be noted that the convolution computation in step S122 may also have other changes.

Figures 15, 16:
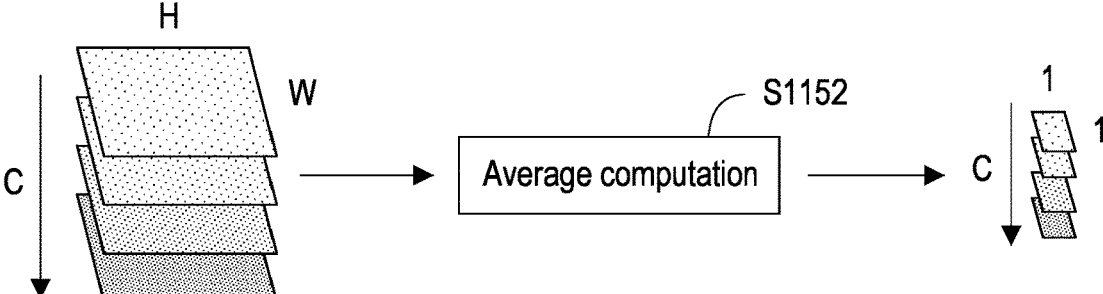
FIG. 15 is a flowchart of a high dynamic range block according to an embodiment of the disclosure.
FIG. 16 is a schematic diagram of an average computation according to an embodiment of the disclosure.

FIG. 15 is a flowchart of a high dynamic range block according to an embodiment of the disclosure. Referring to FIG. 15, step S102 of FIG. 10 is taken as an example (it may also be step S115 of FIG. 11). The HDR block is used for HDR processing without reference to other images. The processor 130 may perform a first convolution computation to output the second channel adjusted image (step S1031), and perform an average computation on the second channel adjusted image to output an average image (step S1032). The processor 130 may perform the second encoding on the average image (e.g., reduce the image size) to output the encoded average image (step S1033). The processor 130 may multiply the second channel adjusted image and the encoded average image to output the encoded weighted image (step S1034). Next, the processor 130 may sequentially perform a second convolution computation (step S1035) and one or more second encodings on the encoded weighted image (step S1036 to step S1039). For the second encoding, reference may be made to the descriptions in FIG. 13, FIG. 14A, and FIG. 14B, which are not repeated herein.

FIG. 16 is a schematic diagram of an average computation according to an embodiment of the disclosure. Referring to FIG. 16, it is assumed that the second channel adjusted image is configured with a width×height×channel of W×H×C. In the average computation (step S1032), the pixels in each channel (the channels are distinguished by different shadings) are averaged. Therefore, the average image has the same number of channels as the second channel adjusted image, but each channel has only one pixel (as shown on the right).

Figure 17:
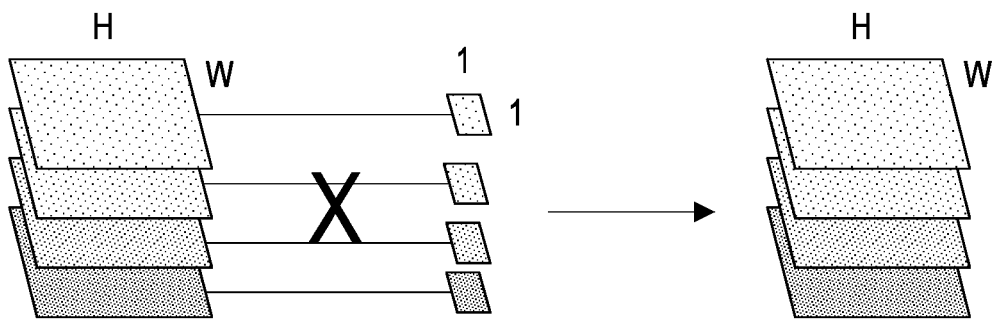
FIG. 17 is a schematic diagram of a multiplication computation according to an embodiment of the disclosure.

FIG. 17 is a schematic diagram of a multiplication computation according to an embodiment of the disclosure.

Referring to FIG. 17, it is assumed that the second channel adjusted image is configured with a width×height×channel of W×H×C. In the multiplication computation (step S1034), the pixels in each channel (the channels are distinguished by different shadings) are multiplied by a single pixel in the same channel of the encoded average image. Therefore, the width×height×channel of the encoded weighted image has the same size as the second channel adjusted image.

Figure 18:
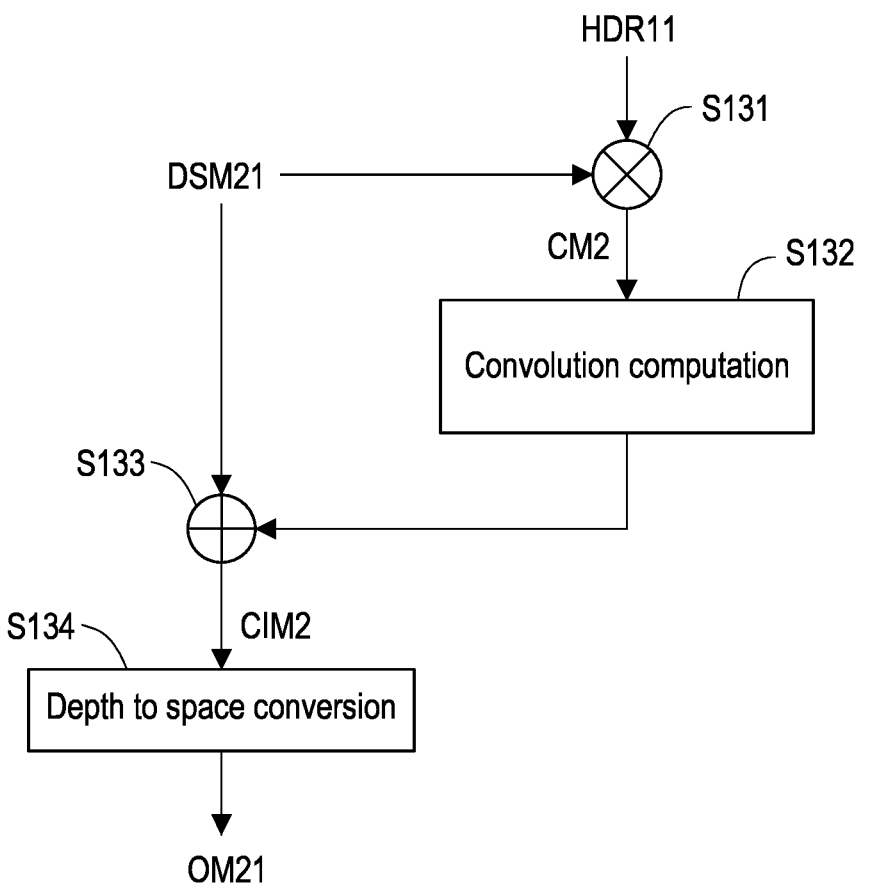
FIG. 18 is a flowchart of a high dynamic range processing block according to an embodiment of the disclosure.

FIG. 18 is a flowchart of a high dynamic range processing block according to an embodiment of the disclosure. Referring to FIG. 18, step S105 of FIG. 10 is taken as an example (it may also be step S119, step S118, step S117, or step S116 of FIG. 11). The processor 130 may combine the first standard dynamic range image DSM21 and the first high dynamic range image HDR11 after the second encoding of the first image OM1 (step S131), and output the second combined image CM2. The processor 130 may perform one or more convolution computations on the second combined image CM2 (step S132), and output enhancement information. Next, the processor 130 may perform high dynamic range processing on the first standard dynamic range image DSM21 according to the enhancement information (step S133), and output the combined image CIM2. For example, the processor 130 may superimpose the enhancement information on the first standard dynamic range image DSM21. The processor 130 may perform depth to space conversion on the combined image CIM2 (step S134), and output the second image OM21.

In one embodiment, the processor 130 may combine the $j+1^{th}$ high dynamic range image and the $j+1^{th}$ standard dynamic range image to output a third combined image. For example, the fourth high dynamic range image HDR24 and the fourth standard dynamic range image DSM24 shown in FIG. 11 are combined. Next, the processor 130 may perform a convolution computation on the third combined image to output the $j^{th}$ high dynamic range image. For example, a convolution computation is performed on the third combined image to output enhancement information, and the enhancement information is superimposed with the fourth standard dynamic range image to output the third high dynamic range image HDR23. In one embodiment, the superimposed image of the enhancement information and the standard dynamic range image may be depth to space converted to generate another high dynamic range image.

Figure 19A:
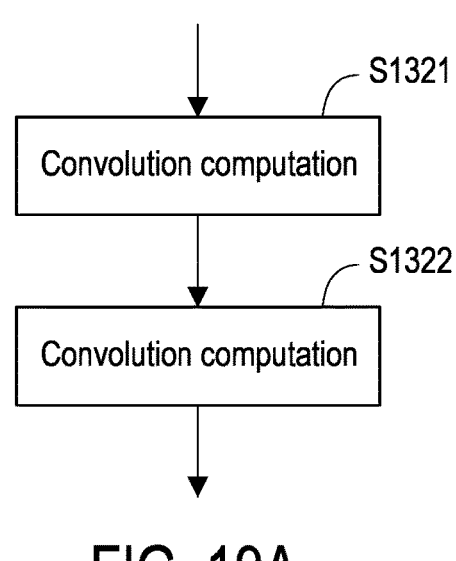
FIG. 19A is a flowchart of a convolution computation according to an embodiment of the disclosure.

FIG. 19A is a flowchart of a convolution computation according to an embodiment of the disclosure. Referring to FIG. 19A, step S132 of FIG. 18 includes two convolution computations (step S1321 and step S1322).

Figure 19B:
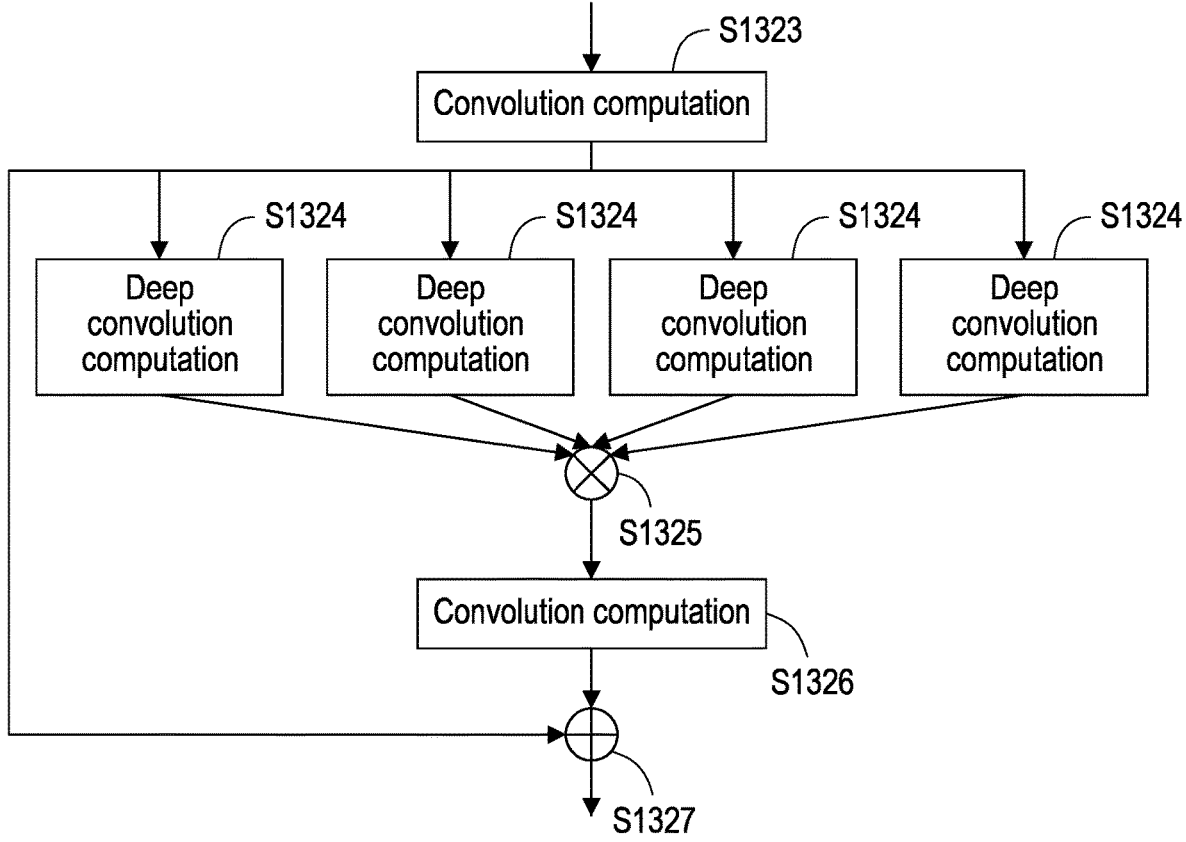
FIG. 19B is a flowchart of a convolution computation according to an embodiment of the disclosure.

FIG. 19B is a flowchart of a convolution computation according to an embodiment of the disclosure. Referring to FIG. 19B, step S132 of FIG. 18 includes two convolution computations (step S1323 and step S1326) and multiple deep convolution computations (step S1324). The processor 130 may respectively perform a deep convolution computation on the output of step S1323 (step S1324). The processor 130 may combine the outputs of the deep convolution computation (step S1325), and perform a convolution computation on the combined image (step S1326). Next, the processor 130 may add/superimpose the outputs of step S1326 and step S1324 (step S1327), and form enhancement information accordingly.

It should be noted that the convolution computation in step S132 may also have other changes.

Figure 20:
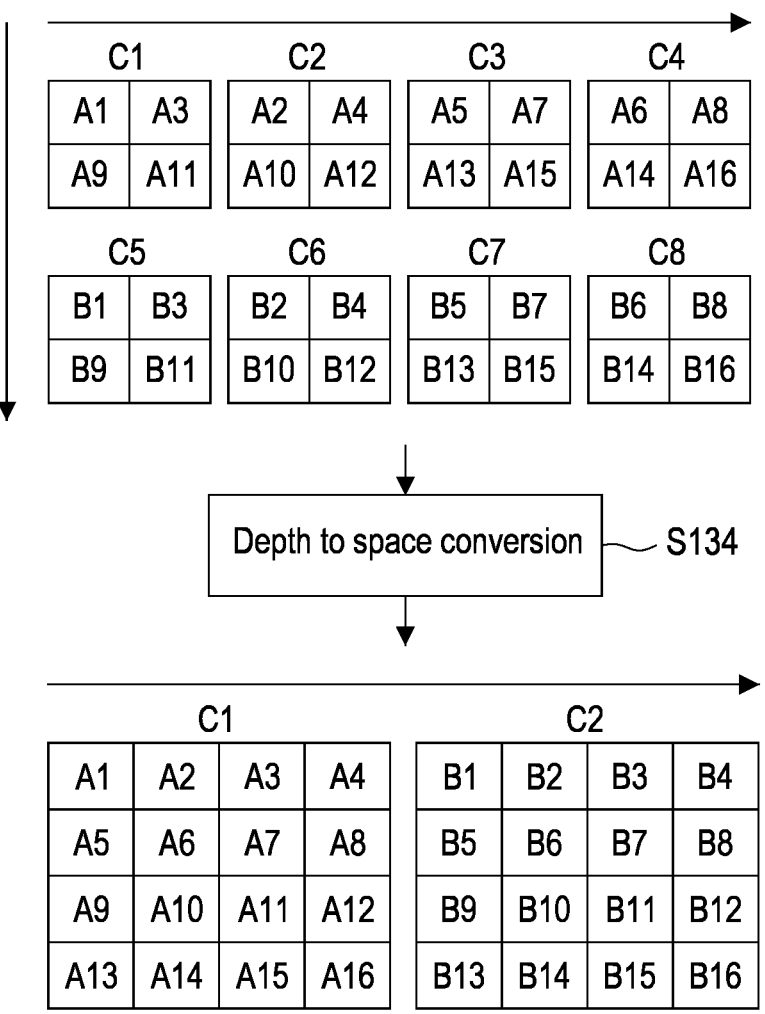
FIG. 20 is a schematic diagram of depth to space conversion according to an embodiment of the disclosure.

FIG. 20 is a schematic diagram of depth to space conversion according to an embodiment of the disclosure. Referring to FIG. 20, step S134 of FIG. 18 is taken as an example, and the other high dynamic range processing blocks are analogous. It is assumed that the combined image CIM2 is configured with a width×height×channel of 2×2×8. In the depth to space conversion (step S134), the processor 130 may assign the pixels A1 to A16 of the channels C1 to C4 to the new channel C1, and assign the pixels B1 to B16 of the channels C5 to C8 to the new channel C2. Finally, a second image OM21 with a width×height×channel of 4×4×2 is formed.

To sum up, in the image processing method and the image processing apparatus according to the embodiments of the disclosure, images that have not been de-noised/sharpened/high dynamic range processed are de-noised/sharpened/high dynamic range processed based on the de-noised/sharpened/high dynamic range image with smaller width and/or height. In this way, the image quality may be effectively improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An image processing method, comprising:
performing first encoding on an input image, to output a first noisy image;
performing a first de-noising computation on the first noisy image, to output a first de-noised image;
performing a format conversion on the first de-noised image;
performing a second de-noising computation on the input image according to the first de-noised image after the format conversion, to output a first image;
performing a high dynamic range (HDR) processing on the first image, to output a first high dynamic range image; and
performing the high dynamic range processing on the first image according to the first high dynamic range image, to generate a second image or the input image;
wherein when the high dynamic range processing is performed on the first image, the high dynamic range processing is performed on the first image according to the first high dynamic range image, to output the second image,
wherein the first encoding comprises a pooling processing.

2. The image processing method according to claim 1, wherein de-noising the input image according to the first de-noised image comprises:
combining the first de-noised image and the input image, to output a first combined image; and
performing at least one convolution computation on the first combined image, to output the first image.

3. The image processing method according to claim 2, wherein the first combined image undergoes the at least one convolution computation to output noise information, wherein de-noising the input image according to the first de-noised image comprises:
de-noising the input image according to the noise information.

4. The image processing method according to claim 1, wherein de-noising the input image according to the first de-noised image comprises:
performing the first encoding on the first noisy image, to output a second noisy image;
de-noising the second noisy image, to output a second de-noised image; and de-noising the first noisy image according to the second de-noised image, to output the first de-noised image, and de-noising the input image according to the first de-noised image.

5. The image processing method according to claim 1, further comprising:

sharpening the first noisy image, to output a first sharpened image; and sharpening the input image according to the first sharpened image, to output the first image.

6. The image processing method according to claim 1, wherein performing the high dynamic range processing on the first image according to the first high dynamic range image comprises:

combining the first high dynamic range image and the first image, to output a second combined image; and performing at least one convolution computation on the second combined image, to output the second image or the input image;

wherein after combining the first high dynamic range image and the first image, to output the second combined image and performing the at least one convolution computation on the second combined image, the second image is output.

7. The image processing method according to claim 6, wherein the second combined image undergoes the at least one convolution computation to output enhancement information, and performing the high dynamic range processing on the first image according to the first high dynamic range image comprises:

performing the high dynamic range processing on the first image according to the enhancement information.

8. The image processing method according to claim 1, wherein performing the high dynamic range processing on the input image according to the first high dynamic range image comprises:

defining the first image as a first standard dynamic range (SDR) image;

performing second encoding on the first standard dynamic range image, to output a second standard dynamic range image;

performing the high dynamic range processing on the second standard dynamic range image, to output a second high dynamic range image; and performing the high dynamic range processing on the second standard dynamic range image according to the second high dynamic range image, to output a first high dynamic range image, and performing the high dynamic range processing on the first image with the first high dynamic range image, to output the second image;

wherein the second encoding comprises a pooling processing.

9. The image processing method according to claim 8, wherein the second encoding comprises:

performing at least one convolution computation on the first image, to output a first channel adjusted image; and combining the first channel adjusted image and image input to the at least one convolution computation.

10. The image processing method according to claim 1, further comprising a space to depth conversion, wherein the space to depth conversion is used for assigning the first image of a single channel to multiple channels to perform the high dynamic range processing to output the first high dynamic range image, and the high dynamic range processing is performed on the first image assigned to the multiple channels according to the first high dynamic range image to output the second image.

11. The image processing method according to claim 8, wherein the high dynamic range processing comprises:

performing a first convolution computation, to output a second channel adjusted image;

performing an average computation on the second channel adjusted image, to output an average image;

performing the second encoding on the average image, to output an encoded average image;

multiplying the second channel adjusted image and the encoded average image, to output an encoded weighted image; and performing a second convolution computation on the encoded weighted image and at least one of the second encoding.

12. The image processing method according to claim 8, wherein the high dynamic range processing comprises:

combining the second high dynamic range image and the second standard dynamic range image, to output a third combined image; and performing at least one convolution computation on the third combined image, to output the first high dynamic range image.

13. The image processing method according to claim 1, wherein before performing the high dynamic range processing comprises:

performing a depth to space conversion, wherein the depth to space conversion is used to assign multiple channels to a single channel.

14. An image processing apparatus, comprising:

a memory, used to store program code; and a processor, coupled to the memory, configured to load and execute the program code to:

perform first encoding on an input image, to output a first noisy image;

de-noise the first noisy image, to output a first de-noised image;

de-noise the input image according to the first de-noised image, to output a first image;

perform a high dynamic range processing on the first image, to output a first high dynamic range image; and perform the high dynamic range processing on the first image according to the first high dynamic range image, to generate a second image or the input image;

wherein when the high dynamic range processing is performed on the first image, the high dynamic range processing is performed on the first image according to the first high dynamic range image, to output the second image, wherein the first encoding comprises a pooling processing.

15. The image processing apparatus according to claim 14, wherein the processor is further configured to:

combine the first de-noised image and the input image, to output a first combined image; and perform at least one convolution computation on the first combined image, to output the first image.

16. The image processing apparatus according to claim 15, wherein the first combined image undergoes the at least one convolution computation, to output noise information, and the processor is further configured to:

de-noise the input image according to the noise information.

17. The image processing apparatus according to claim 14, wherein the processor is further configured to:

perform the first encoding on the first noisy image, to output a second noisy image;

de-noise the second noisy image, to output a second de-noised image; and de-noise the first noisy image according to the second de-noised image, to output the first de-noised image, and de-noise the input image according to the first de-noised image.

18. The image processing apparatus according to claim 14, wherein the processor is further configured to:

sharpen the first noisy image, to output a first sharpened image; and sharpen the input image according to the first sharpened image, to output the first image.

19. The image processing apparatus according to claim 14, wherein the processor is further configured to:

combine the first high dynamic range image and the first image, to output a second combined image; and perform at least one convolution computation on the second combined image, to output the second image or the input image.

20. The image processing apparatus according to claim 19, wherein the second combined image undergoes the at least one convolution computation, to output enhancement information, and the processor is further configured to:

perform the high dynamic range processing on the first image according to the enhancement information.

21. The image processing apparatus according to claim 14, wherein the processor is further configured to:

define the first image as a first standard dynamic range image;

perform second encoding on the first standard dynamic range image, to output a second standard dynamic range image;

perform the high dynamic range processing on the second standard dynamic range image, to output a second high dynamic range image; and perform the high dynamic range processing on the second standard dynamic range image according to the second high dynamic range image, to output a first high dynamic range image, and perform the high dynamic range processing on the first image with the first high dynamic range image, to output the second image;

wherein the second encoding comprises a pooling processing.

22. The image processing apparatus according to claim 21, wherein the processor is further configured to:

perform at least one convolution computation on the first image, to output a first channel adjusted image; and combine the first channel adjusted image and image input to the at least one convolution computation.

23. The image processing apparatus according to claim 14, wherein the processor is further configured to:

perform a space to depth conversion, wherein the space to depth conversion is used for assigning the first image of a single channel to multiple channels to perform the high dynamic range processing, to output the first high dynamic range image, and the high dynamic range processing is performed on the first image assigned to the multiple channels according to the first high dynamic range image, to output the second image.

24. The image processing apparatus according to claim 21, wherein the processor is further configured to:

perform a first convolution computation, to output a second channel adjusted image;

perform an average computation on the second channel adjusted image, to output an average image;

perform the second encoding on the average image, to output an encoded average image;

multiply the second channel adjusted image and the encoded average image, to output an encoded weighted image; and perform a second convolution computation on the encoded weighted image and at least one of the second encoding.

25. The image processing apparatus according to claim 21, wherein the processor is further configured to:

combine the second high dynamic range image and the second standard dynamic range image, to output a third combined image; and perform at least one convolution computation on the third combined image, to output the first high dynamic range image.

26. The image processing apparatus according to claim 14, wherein the processor is further configured to:

perform a depth to space conversion, wherein the depth to space conversion is used to assign multiple channels to a single channel.

* * * * *